Patented Sept. 17, 1940

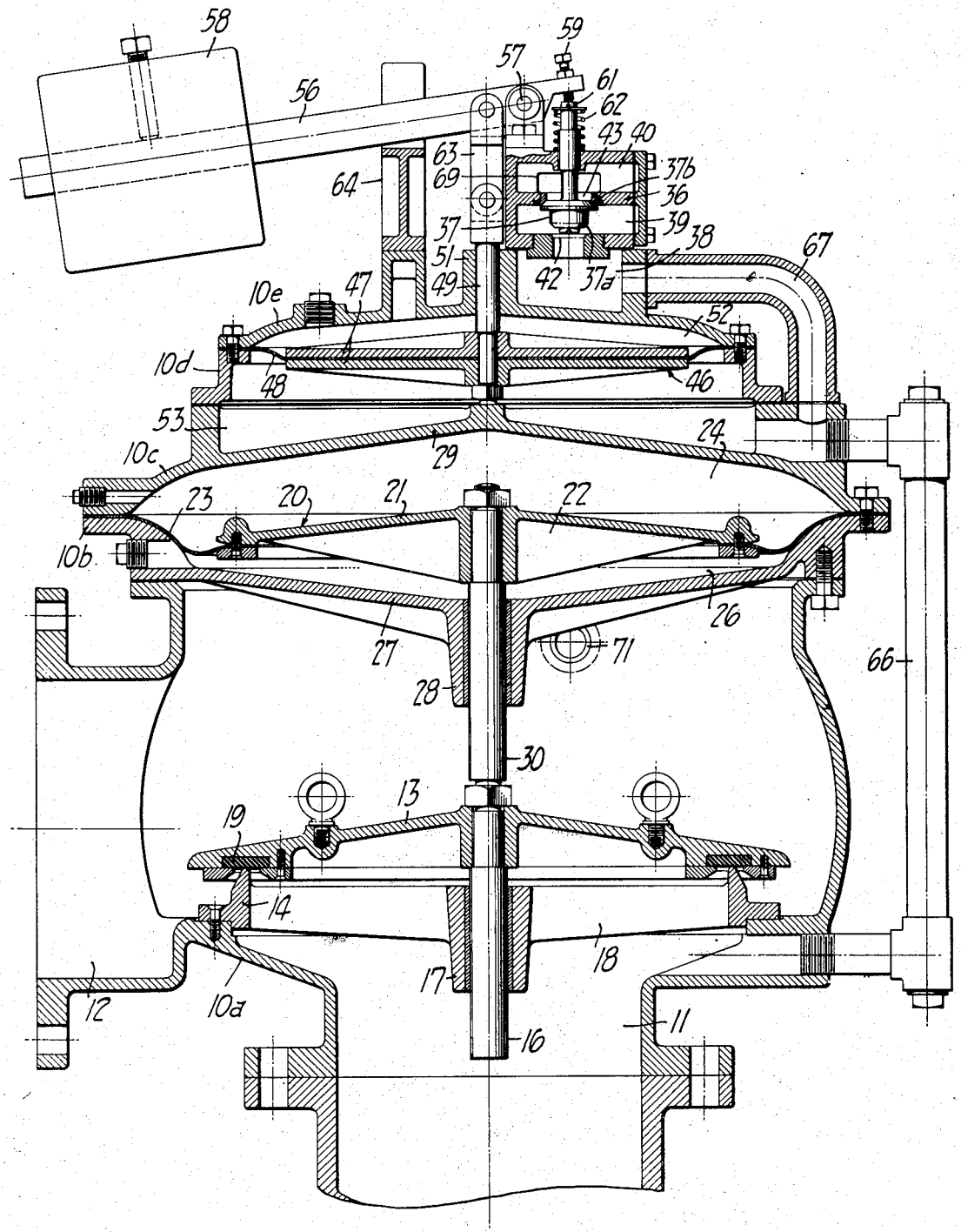
FIG_1_

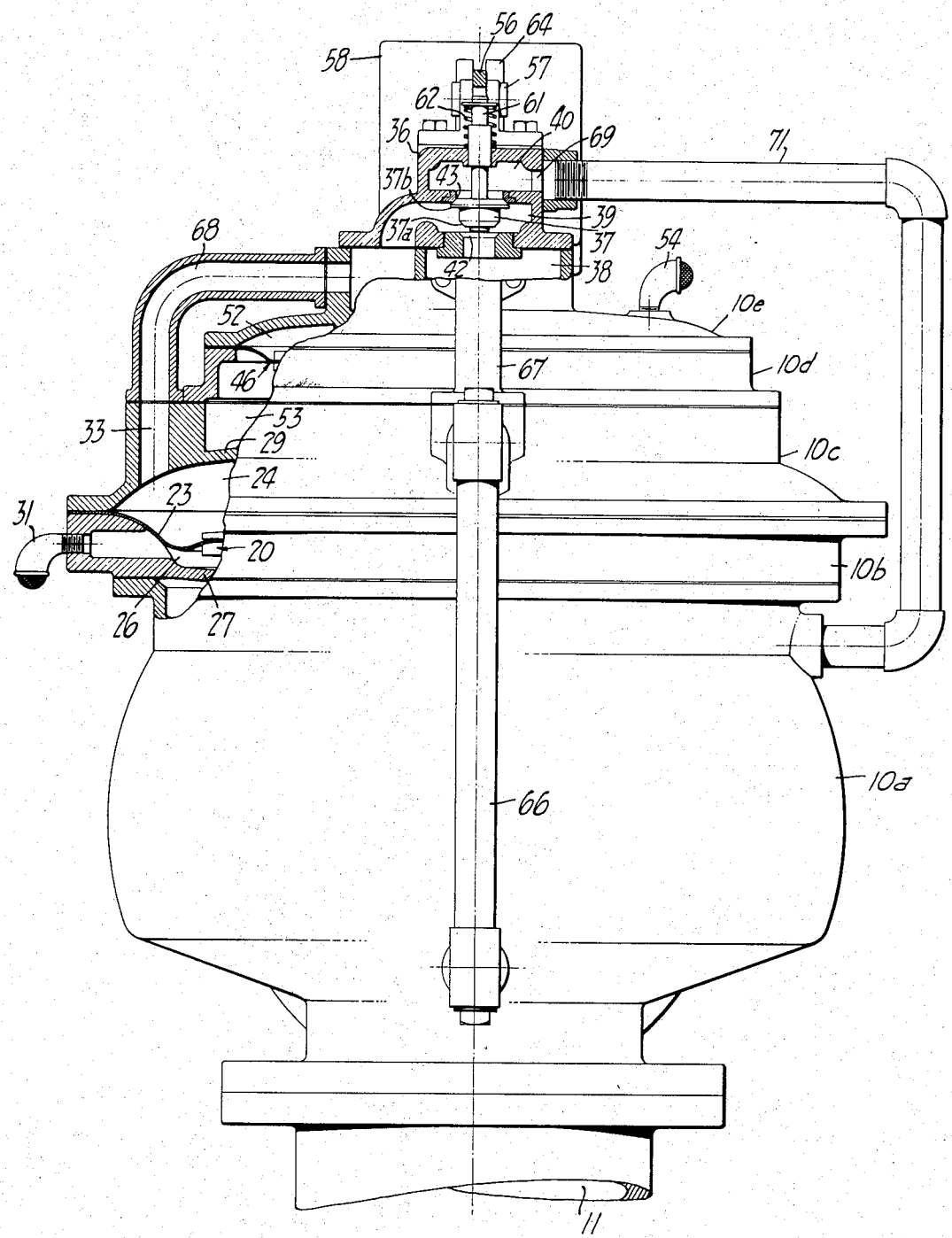
FIG_2_

2,214,963

UNITED STATES PATENT OFFICE 2,214,963

PRESSURE RELIEF VALVE

Albert E. Jurs, Piedmont, Calif.

Application January 16, 1937, Serial No. 120,955

4 Claims. (Cl. 137—53)

This invention relates generally to devices for automatically relieving gas or vapor pressures, such as may accumulate in gas or vapor systems. Such devices are useful in connection with pressure receivers or storage tanks, such as storage tanks containing volatile liquids like gasoline or other petroleum fractions, and where the vapor pressure within the tank must be relieved by venting or withdrawal of gas, when it attains a predetermined value.

It is an object of the invention to provide a device of the above character which will be relatively sensitive in responding to the attainment of a predetermined gas pressure, but which will be characterized by application of forces of relatively high magnitude upon the main valve member, in retaining the main valve member closed and in moving it to open position. In the form of the invention disclosed herein the forces applied to the main valve member are adequate under all adverse climatic conditions to which the device may be subjected, even though accumulations of ice may tend to bond the main valve member to its seat.

Another object of the invention is to provide a pressure relief device or valve which will be characterized by positive opening and closing movements, in responding to predetermined pressure changes. Thus when the main valve has been opened in response to a predetermined pressure on the inlet side, it does not tend to assume such intermediate positions as to throttle or partially restrict the gas flow.

Another object of the invention is to provide a gas relief device or valve suitable for use with tanks for the storage of like petroleum fractions, which will be an improvement over devices previously used for such purposes, particularly with respect to compactness, immunity to adverse climatic conditions, and positive reliable operation without frequent servicing.

Further objects of the invention will appear from the following description in which the preferred embodiment has been set forth in detail in conjunction with the accompanying drawings.

Referring to the drawings:

Fig. 1 is a side elevational view, in cross-section, illustrating a device incorporating the present invention.

Fig. 2 is a side elevational view of the same device shown in Fig. 1, turned through 90°, and partly in cross section.

That form of the device illustrated in the drawings consists of a hollow body 10a, provided with an inlet opening 11, and an outlet opening 12. Where the device is used with a storage tank containing petroleum fractions, the outlet 12 may connect to a vapor recovery system, or may discharge directly to the atmosphere. Within the valve body there is a main valve member 13, which normally rests upon an annular valve seat 14. In order to guide the valve member 13 in vertical movements between open and closed positions, it is attached to a guide rod 16, the lower end of which is slidably engaged by the guide bearing 17. This bearing in turn can be carried by radial webs 18. The lower surface of valve member 13, which contacts the upper face of the seat ring 14, can be faced with a removable ring 19, formed of suitable material such as "Duprene" or like resilient synthetic rubber.

A characteristic of the main valve and its associated seat, is that the cross-sectional area of the opening through the valve seat is much greater than the cross-sectional area presented by the inlet opening 11. The purpose of this arrangement, which is contrary to conventional practice, is to enable the main valve member to present a relatively large area to the gas pressure on the inlet side of the device. Thus for a given gas pressure upon the inlet side, the gas will exert force of relatively high magnitude tending to urge the valve member towards open position.

Associated with the main valve member 13 there is a diaphragm 20 which is acted upon by fluid pressure to normally hold down the main valve member against its seat. Thus a guide rod 30, which is aligned with guide rod 16, is attached to the center of a disc 21. Since this disc may be of a relatively large diameter, it is shown dished and reinforced by the ribs 22. The periphery of this disc is attached to a flexible annular diaphragm portion 23. For the purpose of forming gas chambers 24 and 26 upon the upper and lower sides of the diaphragm, additional body sections 10b and 10c, are shown assembled upon the main body section 10a. Section 10b affords a wall 27 extending below the diaphragm 20, and forms a guide bearing 28 for the guide rod 30. Section 10c forms a wall 29, extending over the upper side of the diaphragm 20. Chamber 26 is vented to the atmosphere or to some other suitable source of gas at relatively low pressure, through the screened fitting 31. Chamber 24 is in communication with a duct 33, which as will be presently explained, is normally in communication with the inlet side of the device, whereby inlet pressure is applied to the upper side of the diaphragm, to normally hold down the main valve member 13 in closed position.

Pilot valve means, responsive to pressure on the inlet side of the device, is provided for venting gas pressure in chamber 24. In the representative construction illustrated, parts of this pilot valve means are associated with the ring 10d, which is mounted upon the body part 10c, and also with the plate 10e, which serves as a closure extending across the ring 10d. Thus mounted upon the cover 10e there is a pilot valve body 36, within which is disposed the pilot valve member 37. The valve body 36, in conjunction with a part of the cover 10e, forms the three spaces or compartments 38, 39 and 40. Compartments 38 and 39 can be placed in communication through the valve seat 42, while compartments 39 and 40 can be placed in communication through the seat 43. Pilot valve member 37 cooperates with both seats 42 and 43, being provided with a lower valve portion 37a for engaging seat 42, and an upper valve portion 37b of somewhat larger diameter, for cooperating with seat 43. When portion 37b is closed upon seat 43, as illustrated in the drawing, then compartments 38 and 39 are placed in communication, through seat 42. Conversely when valve portion 37a closes upon seat 42, compartments 39 and 40 are placed in communication.

Before describing the various fluid connections to the compartments 38, 39 and 40, the so-called secondary diaphragm will be described, together with its mechanical connection to the pilot valve member. Thus in the space afforded above wall 29, there is a secondary diaphragm 46, which can be substantially smaller in diameter than the main operating diaphragm 20. This diaphragm can be formed of the rigid plates 47, which are shown clamped upon opposite sides of the flexible diaphragm portion 48. The peripheral margin of this flexible diaphragm portion, is shown clamped between the body parts 10d and 10e. Plates 47 are secured to the lower end of a guide rod 49, which in turn extends upwardly through the guide bearing 51, to the exterior. Gas chambers 52 and 53 are thus formed upon the upper and lower sides of the diaphragm 46, with the chamber 52 being vented to the atmosphere or some other source of relatively low gas pressure, through the screened fitting 54.

A suitable operating connection between the diaphragm rod 49, and the pilot valve member 37, can be formed as follows: Above the upper end of rod 49 there is a lever 56, which has a fulcrum mounting 57 upon the pilot valve body 36. A weight 58 is adjustably mounted upon the long arm of this lever. The short arm carries a set screw 59, the lower end of which engages the upper end of the pilot valve stem 61. A light compression spring 62 is associated with the pilot valve stem, in order to normally bias the pilot valve member to its elevated position as illustrated in the drawings. Lever 56 is also connected to the upper end of the rod 49, through link 63. A bracket 64 can be provided for generally guiding lever 56, and for limiting the lowermost position of weight 58.

The various fluid connections can now be described as follows: A pipe 66 is connected to the inlet side of the device and establishes communication with the chamber 53, below the secondary diaphragm 46. Also pipe 66 is in continuous communication with the compartment 38 through pipe 67. Compartment 39 of the pilot valve means connects with pipe 68, which in turn communicates through the duct 33 with the chamber 24, above the diaphragm 20. Compartment 40 is either in communication with the atmosphere through port 69, or instead of venting through the atmosphere, this compartment can be connected by pipe 71, to the outflow side of the device.

Operation of the device can now be reviewed as follows: It will be presumed that by a suitable setting of weight 58, the device has been adjusted to cause opening of the main valve member, when the pressure on the inlet side has attained a value of say 4 pounds per square inch. While the pressure on the inlet side is below 4 pounds per square inch, pilot valve member 37 is in its elevated position illustrated in the drawing, and inlet gas pressure is transmitted through pipe 66 and is impressed not only upon the lower side of the diaphragm 46, but also through pipe 67, compartment 38, compartment 39, and pipe 68, to the chamber 24, to cause the diaphragm 20 to be urged downwardly to securely hold down the main valve member 13 against the seat 14. When the inlet pressure increases to a value of 4 pounds per square inch, the pressure upon the secondary diaphragm 46 is sufficient to move this diaphragm upwardly with the result that the pilot valve member 37 is moved to its second or lowermost operating position. When this occurs the chamber 24 above the main diaphragm 20 is vented to the atmosphere, through pipe 68 and communicating compartments 39 and 40. If pipe 71 is used, gas from chamber 24 is vented to the outflow side of the device, which is at a substantially lower pressure than the pressure of the inflow side. Thus immediate reduction of pressure in chamber 24, permits the pressure acting upwardly upon the lower side of the main valve member 13, to elevate this valve member to open position. The movement of the main valve member 13 is relatively abrupt, and there is no tendency for it to take an intermediate throttling position, due to the relatively large area presented by the lower side to the inlet pressure, and due to the sudden reduction of pressure in chamber 24.

Assuming now that the pressure on the inlet side of the regulator is again reduced to a value slightly below 4 pounds per square inch, reduction of pressure in the chamber 53 below diaphragm 46, permits the diaphragm 46 to move downwardly. Thus weight 58 drops back to its initial position, and pilot valve member 37 is returned towards the normal position illustrated in Figs. 1 and 2. This serves to apply inlet gas pressure to the chamber 24, with the result that diaphragm 20 moves downwardly and positively closes the main valve member 13 upon its seat.

Reference has been made to the relatively large size of the valve seat 14, and the passage or opening provided by the same. It has been explained that by this expedient, a relatively large area is presented to the inlet pressure, by the lower face of the main valve member. In my device this area is calculated so that for a given pressure of operation, the upward force upon the main valve will be sufficient to break away any ice formation, such as may tend to bond the valve member fast upon its seat. This feature is of particular advantage in connection with storage tanks for petroleum fractions, where the pressure relief device may be subjected to extreme climatic conditions, and where it is not uncommon for ice formation to bond the main valve member upon its seat. With my device an ample factor of safety is afforded, so that irrespective of any ice formation, the main valve member is positively moved to open position, at the pre-determined pressure of operation for which the device has been adjusted.

It has been pointed out that under normal conditions, with the main valve member closed, the diaphragm 20 exerts considerable pressure in forcing the main valve member upon its seat. Aside from the manner in which this feature is utilized to cause positive opening movement, normal holding down of the main valve is desirable in that it tends to insure a tight seal with respect to the valve seat, irrespective of any slight amount of warping to which the main valve member may be subjected.

I claim:

1. In a gas pressure relief valve of the type having a main valve and a pilot valve for controlling the operation of said main valve, the combination of: a valve body having inflow and outflow openings, a valve seat within said valve body above said inflow opening, a main valve of the disc type adapted to close upon the upper side of said valve seat, a stem depending from said main valve, said main valve having a central opening and said stem having a reduced portion received in said opening and projecting above the top face of said main valve, means securing said stem to said main valve, means forming a vertical guide for said stem to guide the main valve during its movement in opposite directions between closed and open positions, a flexible diaphragm mounted in said valve body above said main valve, a rod connected with said diaphragm and extending toward said main valve, a vertical guide for guiding said rod, the lower end of said rod normally having abutting engagement with the upper end of said stem, whereby when said diaphragm is pressed downwardly said main valve will be urged into engagement with its seat, means forming a pressure chamber above said flexible diaphragm, and passage means for conducting gas under pressure to said pressure chamber, the flow of gas through said passage means to said pressure chamber being controlled by said pilot valve.

2. In a gas pressure relief valve of the type having a main valve and a pilot valve for controlling the operation of said main valve, the combination of: a valve body having inflow and outflow openings, an annular valve seat within said valve body adjacent said inflow opening, the effective cross-sectional area of the opening in said annular valve seat being substantially greater than the effective cross-sectional area of said inflow opening, a main valve of the disc type adapted to close upon said annular valve seat, and gas pressure means providing the sole means for maintaining said main valve closed, the flow of gas to said gas pressure means being controlled by said pilot valve.

3. In a gas pressure relief valve of the type having a main valve and a pilot valve for controlling the operation of said main valve, the combination of: a valve body having inflow and outflow openings, a valve seat within said valve body above said inflow opening, the effective cross-sectional area of the opening in said valve seat being substantially greater than the effective cross-sectional area of said inflow opening, a main valve of the disc type adapted to close upon the upper side of said valve seat, means forming a vertical guide for said main valve to guide the same during its movement in opposite directions between closed and open positions, a flexible diaphragm mounted in said valve body above said main valve, means interposed between said diaphragm and said main valve for enabling said diaphragm to influence the opening and closing of said main valve, means forming a pressure chamber above said flexible diaphragm, and passage means for conducting gas under pressure to said pressure chamber, said gas pressure being the sole means for maintaining the main valve seated, the flow of gas through said passage means to said pressure chamber being controlled by said pilot valve.

4. In a gas pressure relief valve of the type having a main valve and a pilot valve for controlling the operation of said main valve, the combination of: a valve body having inflow and outflow openings, a valve seat within said valve body above said inflow opening, the effective cross-sectional area of the opening in said annular valve seat being substantially greater than the effective cross-sectional area of said inflow opening, a main valve of the disc type adapted to close upon the upper side of said valve seat, a stem depending from said main valve, means forming a vertical guide for said stem to guide the same during its movement in opposite directions between closed and open positions, a flexible diaphragm mounted in said valve body above said main valve, a rod connected with said diaphragm and extending toward said main valve, a vertical guide for guiding said rod, the lower end of said rod normally having abutting engagement with said main valve, whereby when said diaphragm is pressed downwardly said main valve will be urged into engagement with its seat, means forming a pressure chamber above said flexible diaphragm and passage means for conducting gas under pressure to said pressure chamber, said gas pressure being the sole means for maintaining the main valve seated, the flow of gas through said passage means to said pressure chamber being controlled by said pilot valve.

ALBERT E. JURS.